INVENTORS
Abraham Hertzberg
Frank J. Stoddard
Roger C. Weatherston
BY
Popp and Sommer
ATTORNEYS

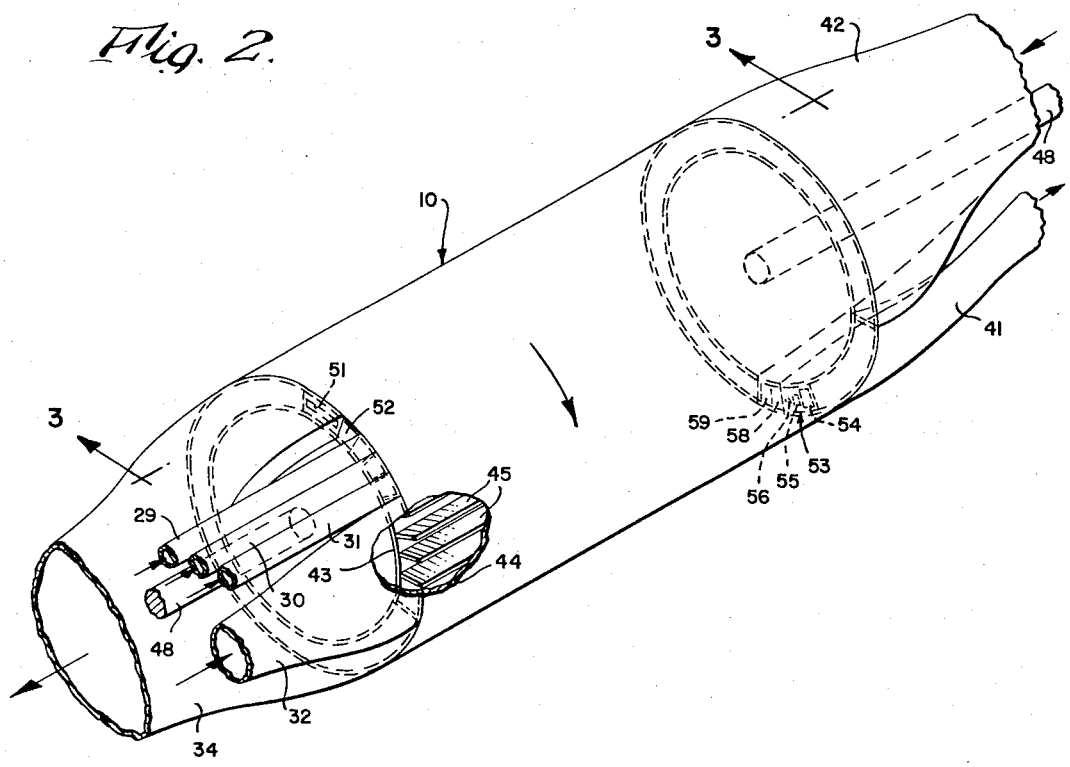
Fig. 2.
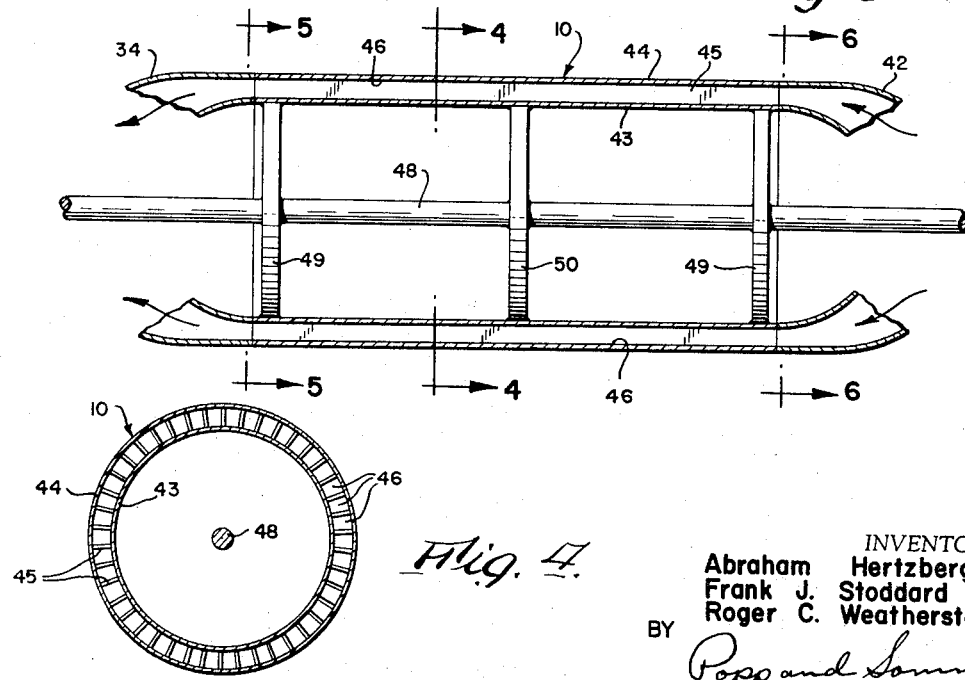
Fig. 3.
Fig. 4.
INVENTORS
Abraham Hertzberg
Frank J. Stoddard
Roger C. Weatherston
BY *Popp and Sommer*
ATTORNEYS

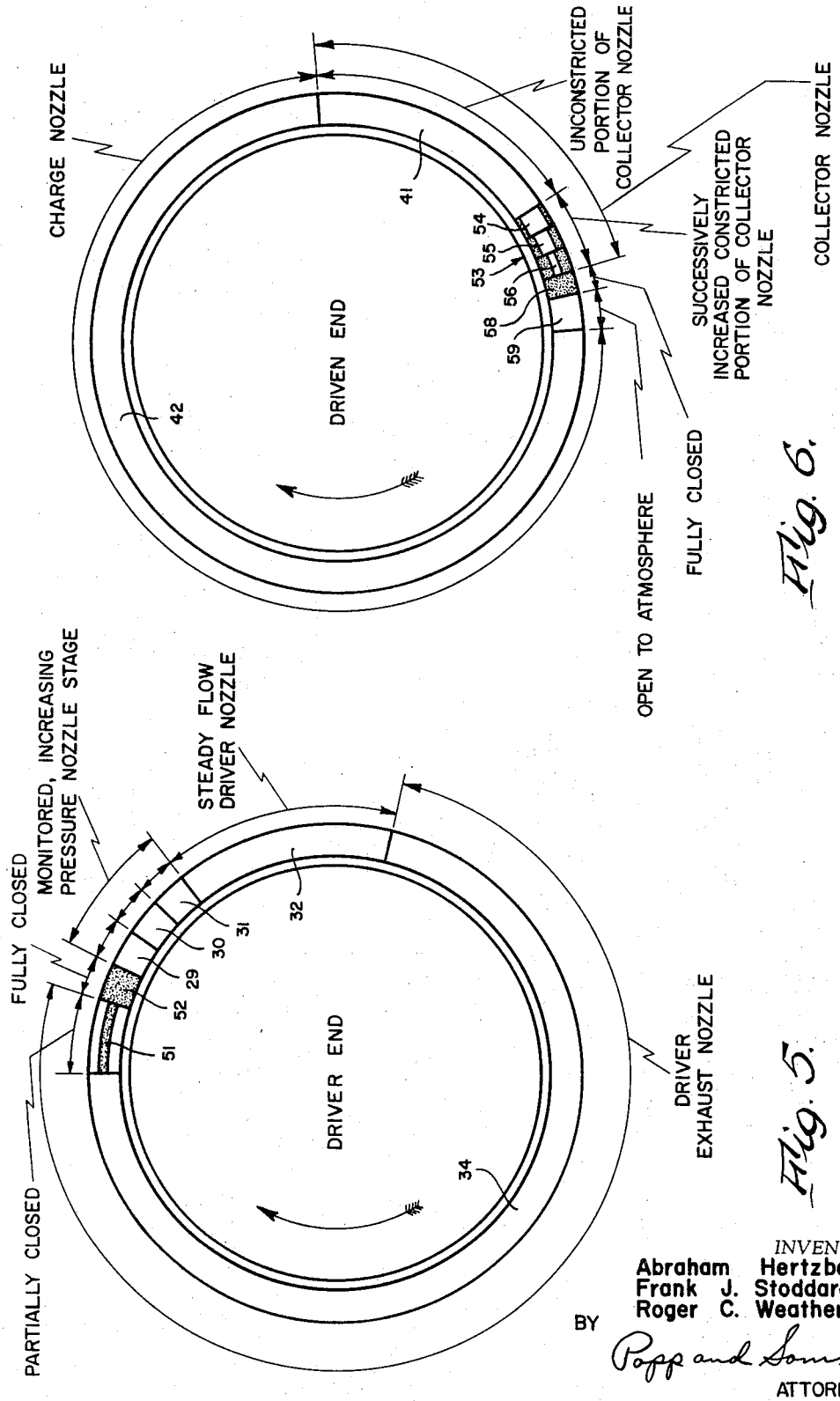

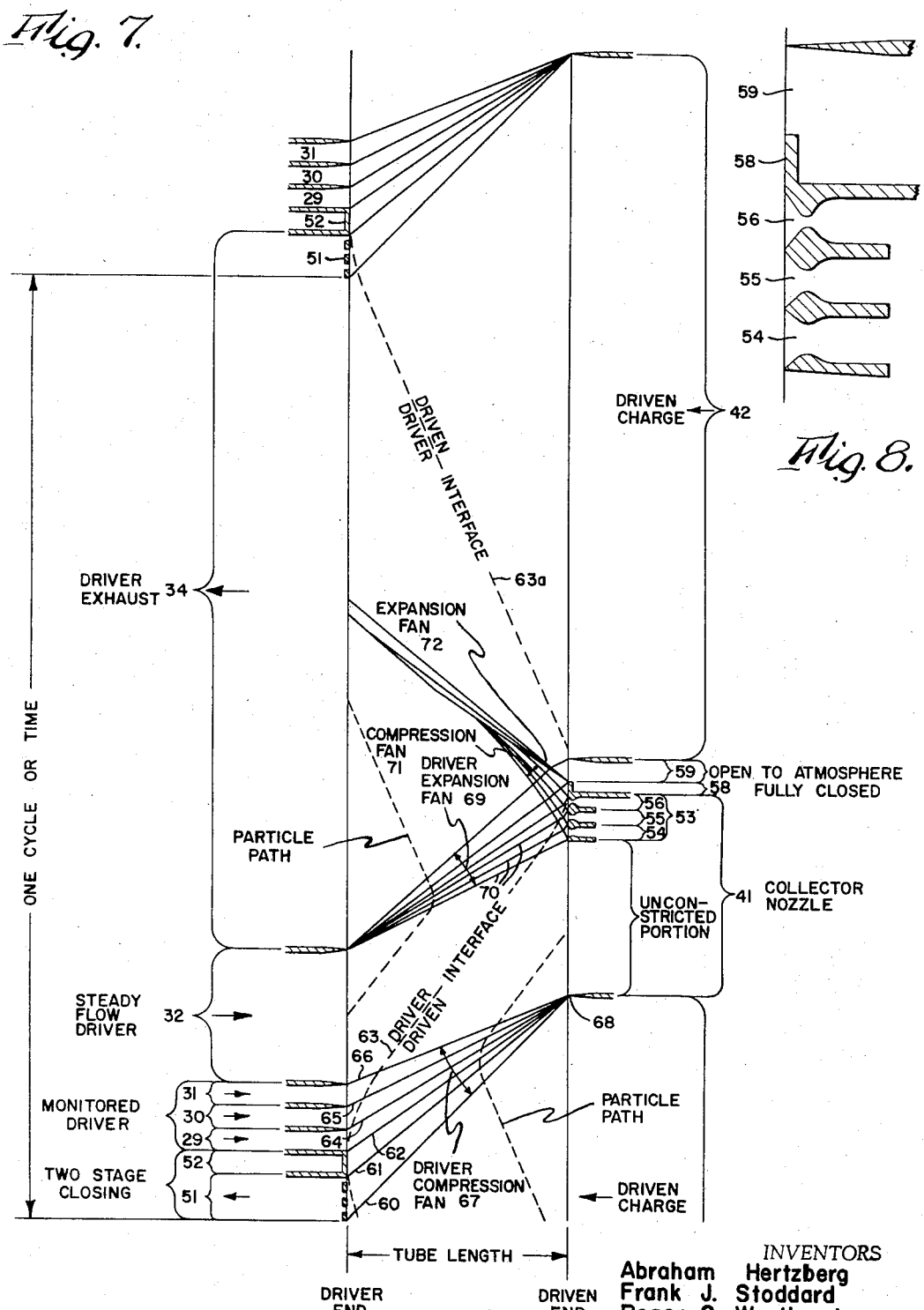

United States Patent Office 3,367,563
Patented Feb. 6, 1968

3,367,563
METHOD INVOLVING THE INTERACTION BETWEEN A DRIVER GAS AND A DRIVEN GAS
Abraham Hertzberg, Tonawanda, Frank J. Stoddard, Depew, and Roger C. Weatherston, Williamsville, N.Y., assignors to Cornell Aeronautical Laboratory, Inc., Buffalo, N.Y., a corporation of New York
Filed July 19, 1965, Ser. No. 473,248
1 Claim. (Cl. 230—69)

ABSTRACT OF THE DISCLOSURE

Energy is transferred more efficiently from a driver gas to a driven gas by subjecting the driven gas to a successively more energetic driver gas, either by increasing the pressure of the driver gas, by increasing its temperature or by decreasing its molecular weight, under conditions to generate a fan of focused shocks which propagate through the driven gas. Also, the temperature of the driven gas can be reduced by selecting a driver gas that has a higher molecular weight than the driven gas so that the speeds of sound on opposite sides of the interface are made as close as practical.

---

This invention relates to the interaction between a driver gas and a driven gas, and more particularly to improvements in compressing a driven gas with a driver gas and in transferring energy from the driver gas to the driven gas.

A general object of the present invention is to provide a method of approching isentropic compression of a gas.

Another general object is to provide a method of transferring energy from a driver gas to a driven gas which will be efficient in the utilization of the driver gas.

Still another general object is to provide a method of transferring energy from a driver gas to a driven gas which will reduce the temperature rise in the driven gas.

A further general object is to provide a method of transferring energy near isentropically from a driver gas to a driven gas and yet enjoy a large temperature ratio between the input driver gas and the compressed driven gas.

A more specific is to provide such a method in which the driven gas can be compressed to relatively high compression ratios such as from 3 to 10, for example.

Another specific object is to provide a method of transferring energy efficiently from a driver gas, the temperature of which is too high to be used directly as a drive fluid for a mechanism such as a turbine, for example, which requires the temperature of its drive fluid not to exceed a predetermined temperature, to a driven gas which will have a temperature not exceeding said limit and thereby rendered suitable for use as the drive fluid for such mechanism.

Other objects and advantages of the present invention will be apparent from the following detailed descriptioin of embodiments of apparatus in which the inventive process may be practiced taken in conjunction with the accompanying drawings wherein:

FIG. 2 is a perspective view of the energy exhanger diagrammatically represented in FIG. 1, portions of the exchanger being broken away to reveal the interior.

FIG. 3 is a vertical longitudinal sectional view through the exchanger and taken on line 3—3 of FIG. 2.

FIG. 4 is a vertical transverse sectional view through the exchanger intermediate its ends and taken on line 4—4 of FIG. 3.

FIG. 5 is a vertical transverse schematic view taken generally on line 5—5 of FIG. 3 and showing the nozzle arrangement at the driver end of the energy exchanger.

FIG. 6 is a vertical transverse schematic view taken generally on line 6—6 of FIG. 3 and showing the nozzle arrangement at the driven end of the energy exchanger.

FIG. 7 is a diagram illustrating the interaction of the various waves developed in the energy exchanger shown in FIG. 2, the abscissa of this diagram representing the axial distance along the length of the exchanger tube and the ordinate of this diagram representing the developed circumference of the exchanger and also time.

FIG. 8 is a fragmentary enlarged sectional view of the constricted portion of the driven gas collector nozzle and adjacent structure, all as shown in FIG. 7.

Figure 1:
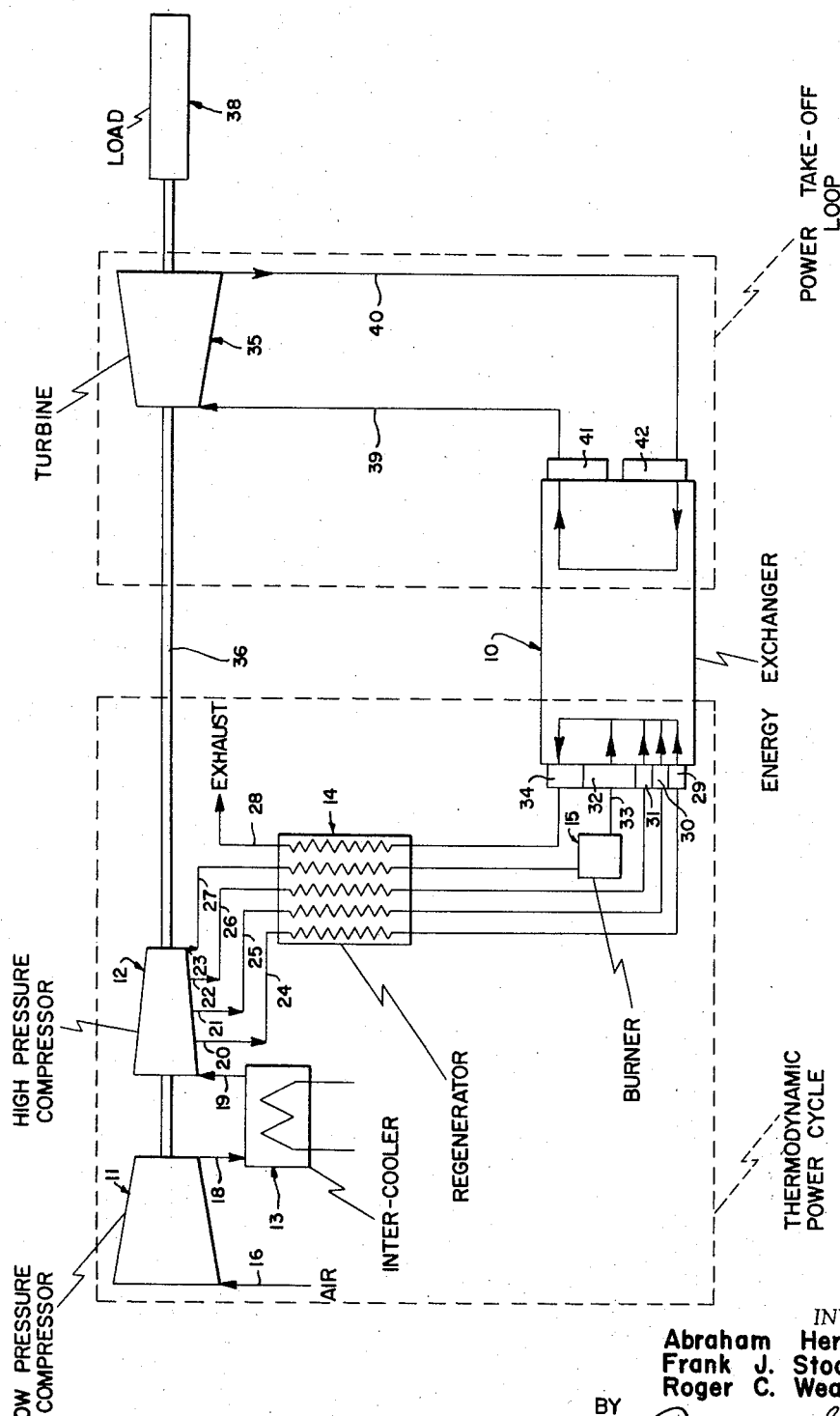
FIG. 1 is a flow chart of a system for carrying out one form of the inventive method in a single stage energy exchanger shown as being operatively interposed between apparatus providing a thermodynamic power cycle and apparatus providing a power take-off loop.

In general, a method is practiced in accordance with one facet of the present invention by subjecting a driven gas to contact with a successively more energetic driver gas and monitored as a function of time to generate a series of shocks which propagate through the driven gas and all are focused at substantially the same place. In other words, all shocks arrive at substantially the same place at the same time. This multiplicity of shocks provides efficient or near isentropic compression of the driven gas contrasted to the case where large compression ratios (say above 3) are attained with only one or two shocks.

Another facet of the present invention is to provide a method by which the terminal portion of the collection of the shock compressed driven gas is monitored so that advantage is taken of the motion of the driver gas following the driven gas to provide a residual compression process which facilitates a reduction in the amount of driver gas. This is achieved by timing the sudden cut off of the driver gas so that the leading elements of the driver expansion fan propagate through the driver gas and overtake the interface between the driver gas and the driven gas before the interface reaches the driven end of the energy exhanger.

Still another facet of the present invention is to match, as closely as practical, the speeds of sound on opposite sides of the interface between a hot driver gas and a colder driven gas by utilizing a driven gas of lower molecular weight than the driver gas thereby providing a lower temperature in the driven gas. This production of both a lower temperature and a smaller temperature rise in the driven gas has important commercial significance where the driven gas receives its energy from a driver gas having a temperature too high to be used directly to drive a mechanism which can be operated only by a fluid having a temperature below a predetermined level, whereas the driven gas can be utilized as the drive fluid for such mechanism because its temperature is below such limit.

Finally, it is in keeping with the inventive concept also to provide a cyclically repetitive process in which the pressure and velocity of spent driver gas from one cycle is matched to the pressure and velocity of a fresh charge of driven gas to be shock compressed in the next cycle.

Apparatus for preparing the driver gas is shown diagrammatically in FIG. 1 as enclosed by a broken line designated thermodynamic power cycle, and apparatus for utilizing the driven gas is also shown diagrammatically in the same figure as enclosed by a broken line designated power take-off loop, an energy exchanger represented generally by the numeral 10 being shown as the apparatus linking the thermodynamic power cycle or loop to the power take-off loop.

The thermodynamic power cycle or loop which produces a successively more energetic driver gas is shown as comprising a low pressure air compressor 11, a high pressure air compressor 12, an intercooler 13, a regenerator or heat exchanger 14, and a burner 15. These components may be of any suitable construction. More specifically, the compressor 11 has an air inlet 16 and an outlet 18 for compressed air which flows through the intercooler 13 and enters an inlet 19 for the compressor 12. This compressor is shown as having four outlets 20, 21, 22 and 23 for compressed air which represent bleed-offs at differents pressure levels, progressing upwardly in value from leftmost outlet 20 to rightmost outlet 23. These outlets 20–23 are shown as severally connected to conduits represented by the lines 24–27, respectively, which extend through regenerator 14 in heat exchange relationship with an exhaust conduit 28 later to be described.

Conduits 24–26 are shown severally as leading to and being connected in fluid conducting relation to inlet nozzles 29, 30 and 31, respectively, for energy exchanger 10. Conduit 27 is shown as connected to burner 15 to which fuel of any suitable type is supplied by any suitable means (not shown). The products of combustion generated in burner 15 are conducted by conduit 33 to a nozzle 32 also for energy exchanger 10. Exhaust conduit 28 is shown as connected to an outlet nozzle 34 for energy exchanger 10.

The gases flowing through the several inlet nozzles 29–32 into energy exchanger 10 are energy laden driver gases and the spent driver gas exhausts through outlet nozzle 34.

The power take-off loop utilizes a driven gas as a drive fluid for a mechanism shown as a turbine 35. This turbine rotates a shaft 36 to which a load 38 of any suitable specific form such as an electric generator, for example, is connected. Compressors 11 and 12 are also shown as being coupled to shaft 36 so as to be driven by turbine 35.

Turbine 35 receives its drive fluid through an inlet conduit 39 and exhausts expanded drive fluid through an exhaust conduit 40. Inlet conduit 39 is shown as connected in fluid conducting relation to a collector nozzle 41, and exhaust conduit 40 has a similar connection to a charge nozzle 42. The fluid circulated through the conduits 41 and 42 is the driven gas acted upon in the energy exchanger 10.

Rererring to FIGS. 2–6, the energy exchanger 10 is shown as comprising inner and outer cylindrical shells 43 and 44, respectively, arranged concentric and in spaced relation to each other. The annular space between shells 43 and 44 is shown as being divided up by a series of longitudinally extending partitions 45 so as to provide a multiplicity of shock tubes 46 of uniform size arranged in an annular bank. The inner and outer longitudinal edges of partitions 45 may be connected to shells 43 and 44 in any suitable manner as by being welded thereto.

The exchanger assembly so far described is shown as supported for rotational movement on an axle or shaft 48 arranged centrally of the shells and extending longitudinally therethrough and carries two disc-like end heads 49, one adjacent each end of the exchanger, and a similar intermediate disc-like support 50, the three disc-like members being arranged within the inner shell and each having its periphery engaging the inner shell and suitably connected thereto as by welding.

The axle 48 is arranged to be rotated in a predetermined direction, clockwise as viewed in FIGS. 2, 5 and 6, at a predetermined angular velocity by any suitable driving means (not shown). Such rotational drive for the exchanger 10 may be variable so as to adapt the apparatus for handling different driver and driven gases and also for permitting the adjustment of the rotative speed of the exchanger for a given set-up in order to obtain maximum efficiency of operation.

As shown in FIG. 2, the various nozzles 29–34 at the driver or left end and the nozzles 41 and 42 at the driven or right end of the energy exchanger 10 terminate in apertures of arcuate configuration and of appropriate radial and circumferential extent so that these apertures will be opposite the corresponding ends of shock tubes 46.

The nozzles at the driver end of the exchanger are depicted in FIG. 5 schematically in circumferential arrangement and at the left of FIG. 7 in developed circumferential layout. Similarly, the nozzles at the driven end of the exchanger are depicted in FIG. 6 schematically in circumferential arrangement and at the right of FIG. 7 in developed circumferential layout.

At this time it is desired to point out that the driven gas exhaust nozzle 34 is open fully in a radial direction with respect to the radial depth of the shock tubes 46, as shown in FIG. 3, except for an end portion 51 which is adjacent inlet nozzle 29 and which is shown as being partially closed. Intermediate this end portion 51 and nozzle 29 is a wall 52 which is dimensioned so as to close fully the end of any shock tube 46 which may be positioned opposite this wall. Each of inlet nozzles 29–32 is also shown as being fully open in a radial direction.

Considering the opposite and driven end of the exchanger, there the driven gas collector nozzle 41 is fully open in a radial direction and hence unconstricted for most of its arcuate extent but this nozzle is shown as including a successively increased constricted portion 53, representatively made up of three sections 54, 55 and 56 of progressively constricted configuration in the order named. Immediately adjacent the most constricted section 56 is a wall 58 which is dimensioned so as to close fully the end of any shock tube 46 which may be positioned opposite this wall. Intermediate wall 58 and the adjacent end of charge nozzle 42 is a section 59 which is open. This charge nozzle 42 is shown as being fully open in a radial direction throughout its circumferential extent.

Since the same things occur in each of the exchanger tubes 46 as shown in FIG. 2, the operation can best be understood by explaining what happens in one of these tubes during one complete revolution of the exchanger drum. To this end reference is made to the diagram in FIG. 7.

Driven gas enters a given tube 46 from the right end through nozzle 42, and flows to the left. This leftward flow continues until the interface between the body of entering driven gas and the body of spent driver gas being exhausted approaches the left end of the tube. At about this time the left end of the tube moves opposite the partially closed portion 51 of the driver gas exhaust nozzle 34. This causes a shock 60 to be generated. This shock 60 propagates to the right through the tube and has the effect of decelerating the body of driven gas moving leftward through the tube.

Shortly thereafter the left end of the tube is completely closed off by moving opposite the fully closed wall 52. This generates a second shock represented by the line 61. The effect of this is to bring the moving body of driven gas to rest. This shock 61 also propagates from the left end of the tube toward the right end thereof.

In this manner, the terminal portion of the driver gas exhaust nozzle 34 is closed in two stages the effect of which is to generate two shocks 60 and 61 which operate to decelerate and stop the entering fresh charge of driven gas. These shocks 60 and 61 propagate through the driven gas charge.

In appropriately timed sequence the tube next passes successively the driver gas inlet nozzles 29, 30, 31. When the tube moves opposite nozzle 29, driver gas at a predetermined temperature and pressure thrustingly engages the end face of the body of driven gas at rest and completely filling the length of the tube. The effect of impact of this body of driver gas upon the driven gas is to create a shock 62 which propagates through the driven gas toward the right end of the tube as viewed in FIG. 7. This creates an interface between driver and driven gas represented by the broken line 63.

Upon the tube moving opposite the second driver gas inlet nozzle 30 where driver gas at a higher pressure and possibly a higher temperature contacts the driven gas, another shock 64 is generated which propagates through the driven gas toward the right end of the tube.

The same thing occurs when the tube moves opposite the driver gas inlet nozzle 31 which introduces driver gas having a still more energetic condition, the shock created thereby being represented by the line 65. This shock also propagates through the body of driven gas toward the right end of the tube.

Immediately following, the tube moves opposite the driver gas inlet nozzle 32 through which driver gas having an even more energetic condition flows under steady flow conditions. This creates another shock 66 which flows through the body of driven gas toward the right end of the tube. Introduction of driver gas through nozzle 32 is continued for a period of time generally longer than required to introduce the less energetic driver gas through nozzles 29–31 severally.

Thus a series of shocks 60–66 or a compression fan 67 is created, the individual shocks of which are generated under controlled conditions and monitored as a function of time so that all of these shocks focus on the right end of the tube as represented by the point 68. In other words, each successive shock propagates through the driven gas at a faster rate due to the fact that the preceding shock (or shocks) has both accelerated the driven gas flow and increased its speed of sound propagation. Hence each shock tends to overtake the preceding one. If the inception of each shock is properly timed the entire compression fan can be focused to arrive simultaneously at substantially the same place. It will be noted that the body of driven gas throughout its entire length is processed by the same number of shock waves and hence will be homogeneous upon discharge.

Steady flow of driver gas is sustained through nozzle 32 to cause the interface 63 to move to the right end of the tube as viewed in FIG. 7. The focal point 68 of the compression fan 67 is at one end of the unconstricted portion of driven gas collector nozzle 41. Since the steady flow of driver gas entering the opposite end of the tube through nozzle 32 moves the body of driven gas to the right, this processed driven gas can be collected through the unconstricted portion of collector nozzle 41.

Continued rotation of the exchanger drum will bring the tube under consideration opposite the end of driver gas inlet nozzle 32 thereby cutting off suddenly the steady flow of driver gas. This operates to generate a fan of expansion waves 69. The several waves making up this fan propagate from the left end of the tube toward the right end of the tube.

A feature of the present invention is to allow the first several expansion waves represented by lines 70 to overtake the interface 63. If the driver gas were allowed to continue until such time as the effect of its cut-off were first made manifest at the driven end when the driver-driven interface arrived there, then all of the driven gas would be collected in one unconstricted collector nozzle such as 41. In the interest of conserving driver gas, however, a feature here is to cut off the driver gas flow before this time and exploit the residual inertia in the leading elements 70 of the driver expansion fan 69 to thrust the last portions of the driven gas into a constricted or compartmented portion 53 of the collector but at the same pressure as those portions of driver gas collected in the steady flow unconstricted part of the collector nozzle. To effect this, it is necessary to successively constrict or compartment the collector nozzle for the capture of those portions of the flow that arrive at the driven end of the tube after the arrival at nozzle 54 of the leading wave 70 from the driver gas cut off. The pressure of the driven gas overtaken by expansion waves 70 will tend to decrease but the successive closure action of the constricted portion of the collector nozzle will cause the generation of a compression fan 71 which will propagate into the driven flow from right to left as viewed in FIG. 7 to compensate this tendency and maintain the pressure level in the last portions of the driven gas. This compensating action can be carried out until such time as the driven flow is brought to rest after which the pressure at the driven end must fall but at this instant (theoretically) the last element of the driven gas will have been collected.

Although the tangible closure action lends feeling to the resultant generation of the compression fan, in reality no such tangible constrictions are essential. It is, however, necessary to separately compartment the leading edge of the collector nozzle in the region where such a compression fan is being formed to eliminate undesirable cross flow effects in the collector mouth. In the collector nozzle plenum, the resultant pressure from both the steady flow portion of driven gas and from the portions collected during the latter phases after the arrival of the first expansion wave from the driver cut off will be the same.

Thus, collection of the driven gas includes removing from the driven end of the energy exchanger an initial portion which has been subjected only to the monitored successions of shocks resulting from progressive closing of the driver end and introduction of driver gas, and also removing from the driven end additional driven gas which has been subjected not only to such successions of shocks but also to the combined action of the driver expansion fan and a subsequent compression fan moving toward the driver end and resulting from the deceleration of such additional driver gas.

After the tube 46 being considered traverses the end of fully closed wall 58 an expansion fan 72 is generated which overtakes compression fan 71 in moving from right to left. When the tube reaches nozzle 42 a fresh charge of driven gas enters the right end of the tube. The interface between the driver and driven gases during this phase of the cycle is represented by the broken line 63a. It will be noted that driver gas is being exhausted from the left end of the tube through nozzle 34 and a fresh charge of driven gas is entering the right end of the tube through charge nozzle 42. This situation continues until a partial closing of the driver gas exhaust nozzle 34 occurs to begin the cycle over again.

Monitoring the closing of the driver gas exhaust nozzle 34 during the phases 51 and 52 and the introduction of successively more energetic driver gas through driver gas inlet nozzles 29–32 to generate a series of shocks which propagate through the driven gas and all are focused at substantially the same place, produces an efficient or near isentropic compression of the driven gas. It will be noted that the driver gas successively introduced must be successively more energetic. In the example illustrated, this is achieved by successively increasing the pressure of the driver gas. A successively more energetic driver gas can also be created by increasing the temperature of the driver gas or by decreasing the molecular weight of the driver gas. Accordingly, it is in keeping with the inventive concept to provide any means for generating the fan of shock or compression waves so long as they are monitored as a function of time in order to coalesce together at one point to accomplish a relatively large compression ratio of the driven gas by a series of small and successive compression steps. More will be said about this later herein.

Regarding the feature of the inventive concept having to do with progressive closing phase 53 of the driven gas collector nozzle 41, it is pointed out that there is considerable available energy in the expansion fan 69 that results from the cut-off of the driver gas through inlet nozzle 32. In fact, there is sufficient energy in the velocity of the lead waves 70 of the fan to compress this driven gas to the same stagnation reservoir conditions as that collected while the full pressure of the driver gas is behind the driver-driven gas interface 63. This being the case, it is possible to conserve driver gas flow by cutting it off at such time that the leading expansion wave overtakes the interface before it reaches the right end of the tube and thereby capitalize on the kinetic energy of the driver gas near the interface to complete the deliverance of the driven gas to the collector nozzle. If no change were made in the collector nozzle the pressure in the collector mouth would tend to drop. However, if the collector nozzle is compartmented as shown in small sections 54–46 beginning when the leading expansion wave from the driver cut-off arrives at the right end of the tube, then the stagnation pressure of the collected driven gas can be sustained for a short time.

As illustrated, the collector nozzle has successive constrictions 54–56 built in that decelerate the flow and send a series of shocks 71 back into the driven flow and driver expansion wave 69. There comes a time when the pressure level in the expansion fan 69 is so low that a complete stagnation of the driven gas flow to zero velocity will no longer compensate to produce a pressure equal to that of the main collector reservoir and at this point collection of driven gas is stopped.

Sometime after the complete stoppage of the outward flow of the driven gas at the right end of the tube it is opened either to the atmosphere as indicated at 59 or to the charge nozzle for driven gas. The pressure level in the tubes 46 opposite charge nozzle 42 at this time, although less than in the collector nozzle 41, is more than in this charge nozzle 42. This opening sends expansion fan 72 into the tubes, moving from right to left, which overtakes and weakens the shocks 71 created by the previous closing action. The last wave from the driver cut-off is of such strength that it eventually induces flow into the tubes from the driven gas nozzle 42 at the original charge velocity and the cycle repeats.

It is a well known fact that thermal to mechanical conversion efficiency in modern gas turbine and steam power plants is dependent upon peak cycle temperature and this is limited by stress, material and corrosion considerations for the turbine. In short, it is the allowable turbine inlet temperature which governs the cycle efficiency of gas turbine cycles. Typical gas turbine cycles of the present day are limited to about the 1200–1400° F. range and thermal to mechanical efficiency of around 30% is attained. It is also a well known fact that a marked increase of thermal to mechanical conversion efficiency can be obtained if a higher turbine inlet temperature can be tolerated.

The energy exchanger 10 can be operated at much higher peak temperatures than the 1200–1400° F. range. This is because the walls of tubes 46 of the exchanger are alternately exposed to both hot and comparatively cold fluids and in addition they can be externally and internally cooled, although such cooling is not illustrated in the drawings. In power cycle applications of the present invention, peak temperatures of about 3000–3500° F. are considered feasible. If the turbine 35 could handle a drive fluid having such a temperature, the result of thermal to mechanical efficiency would be about 60% which is considerably above the 30% level afforded by the conventional turbine cycle. The driver gas entering the energy exchanger 10 is however, much too hot to enter a turbine directly but if the temperature of the driven gas can be made sufficiently cold by comparison to be tolerated for turbine operation and yet contain the energy of the driver gas, it would be suitable as the drive fluid for the turbine. This is accomplished by the present invention.

In the first instance, it is highly desirable to exchange energy from the driver to the driven gas as efficiently as possible. This is achieved by monitoring the input of the driver gas to produce a series of shock or compression waves which approaches isentropic compression of the driven gas. The other condition of the energy exchange that must be met for power cycle application is to effect a marked reduction in driven gas discharge temperature over the driver gas inlet temperature.

In the interest of high efficiencies for the energy exchanger the following considerations are of importance. The driver gas entering the energy exchanger is much too hot to put into a turbine or even to enter the regenerator for reheat of the fresh compressor air. Yet in the interest of high cycle efficiency it is necessary that the combusted air driver gas be very hot (say 3000° F.) It is equally important that the hot driver gas have the energy removed from it in the energy exchanger so that it will be sufficiently cool to enter the regenerator (at say 1600° F.). This requires that the driver gas undergo an efficient (energy absorbing) expansion ratio of about 6. Now if air is used as the driven gas to absorb this energy, and if it comes out of the exchanger sufficiently cold to put directly into a turbine, then it will issue from the tubes near or above Mach one and there will be high losses in the form of tube wall friction and diffuser losses in decelerating the flow in the collector nozzle. If the driven gas is a fluid having a lower molecular weight than air, it will have a higher speed of sound which will enable it to absorb the driver gas energy at lower Mach numbers. The friction and diffuser losses will be reduced. Moreover, there are certain mismatching operational conditions of the energy exchanger proper that are alleviated as the speed of sound of the driver and driven fluids approach each other. An ideal condition of operation is when the velocity and pressure immediately after driver cut-off are restored to the charge conditions and the expansion ratio of the driver equals the compression ratio of the driven. For these conditions the speeds of sound across the driver-driven interface would be equal and the output temperature of the driven gas would be equal to that of the driver gas inlet divided by the molecular weight ratio of air to that of the driven gas.

In accordance with the present invention, the speeds of sound on opposite sides of the interface are made as close at practical by selecting a driven gas which has a lower molecular weight than that of the driver gas. This will enable the temperature of the driven gas to be reduced. Air is an example of a driver gas and air combined with hydrogen, or steam by itself or steam combined with hydrogen are examples of driven gases which will have a lower molecular weight. More specifically, if a small mass fraction of hydrogen, say about 3%, is added to steam and this mixture is the driven gas with air or combusted air acting as the driver gas, the discharge temperature of the driven gas leaving collector nozzle 41 will be only one-half that of the steady flow driver gas entering inlet nozzle 32 for the ideal situation where the driver expansion ratio equals the driven compression ratio. Accordingly, the inlet temperature to the turbine 35 will be only one-half of that of the air as it leaves burner 15 in the thermodynamic, power cycle and enters the energy exchanger 10. Hence with the use of a lighter molecular gas for the driven gas in the power take-off loop both efficient and temperature reducing energy exchange can be attained.

In the example illustrated and so far described, the driven gas and the driver gas entered the tubes 46 of the exchanger 10 from opposite ends. This is not essential. It is possible for the driven gas and the driver gas to enter the same end of the tubes but leave at opposite ends thereof.

The arrangement shown in FIG. 7 enables high energy exchanger efficiencies for practical power plant compression ratios of from 5–10. As an illustration of typical values to achieve a compression ratio of the driven gas of about 6.0, the driver gas admitted through nozzle 29 would have a pressure ratio of about 2.7 as compared to the driven gas before any compression thereof, that through nozzle 30 of about 3.8, that through nozzle 31 of about 4.9, and that through nozzle 32 of about 6.0.

From the foregoing, it will be seen that the present invention accomplishes the various objects stated, and is to be measured by the scope of the appended claim.

What is claimed is:

1. In an energy exchanger power cycle having two distinct loops, the method of transferring energy from one loop to the other which comprises; filling one of said loops with a hot driver fluid, filling the other of said loops with a wholly separate and distinct colder driven fluid having a lower molecular weight than said driver fluid such that the speed of sound in each fluid is substantially the same at an interface therebetween, introducing said driven fluid into a chamber, introducing said driver fluid into said chamber under conditions to permit the expanding driver gas to act upon and compress the driven gas, returning only and substantially all of said driver gas from said chamber to said one loop, and returning only and substantially all of said driven gas from the chamber to said other loop.

References Cited

UNITED STATES PATENTS

| 2,970,745 | 2/1961 | Berchtold | 230—69 |
| 3,082,934 | 3/1963 | Spalding | 230—69 |

ROBERT M. WALKER, *Primary Examiner.*